J. SMITH.
Carriage Wheels and Axles.
No. 197,421. Patented Nov. 20, 1877.
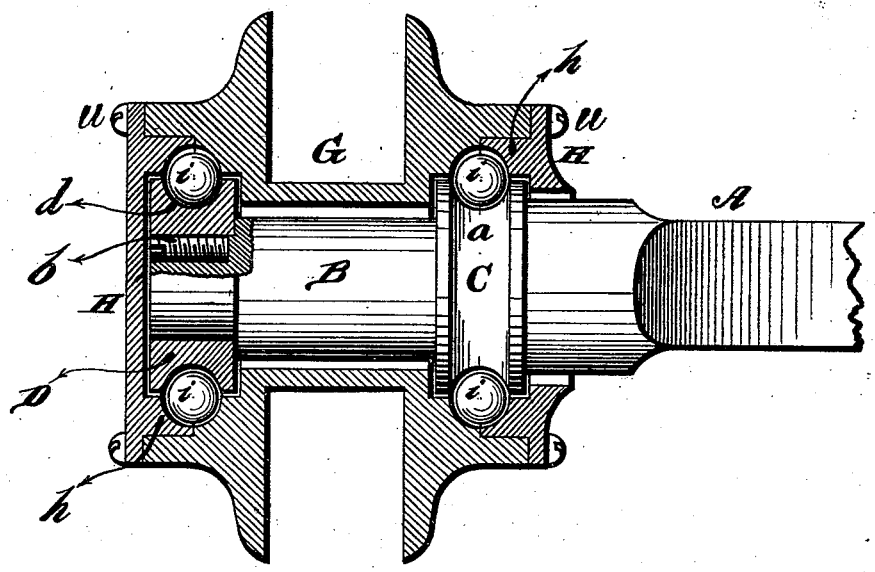
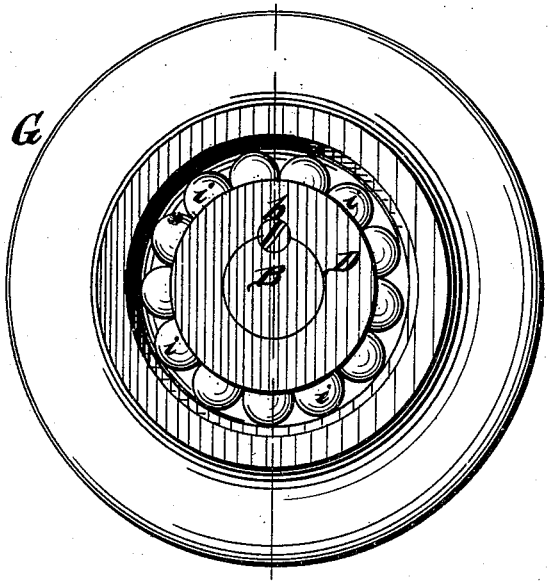
WITNESSES
INVENTOR.
ATTORNEYS.

UNITED STATES PATENT OFFICE.

JOHN SMITH, OF FALL RIVER, MASSACHUSETTS, ASSIGNOR OF ONE-HALF HIS RIGHT TO ELLEN M. SMITH, OF SAME PLACE.

IMPROVEMENT IN CARRIAGE-WHEEL AXLES.

Specification forming part of Letters Patent No. 197,421, dated November 20, 1877; application filed September 1, 1877.

*To all whom it may concern:*

Be it known that I, JOHN SMITH, of Fall River, in the county of Bristol and State of Massachusetts, have invented a new and valuable Improvement in Wheels and Axles; and I do hereby declare that the following is a full, clear, and exact description of the construction and operation of the same, reference being had to the annexed drawings, making a part of this specification, and to the letters and figures of reference marked thereon.

Figure 1 of the drawings is a representation of longitudinal vertical sectional view of my wagon-wheel hub and axle, and Fig. 2 is a face view thereof with cap removed.

The nature of my invention consists in the construction and arrangement of a hub for wagon-wheels, as will be hereinafter more fully set forth.

The annexed drawing, to which reference is made, fully illustrates my invention.

A represents the axle, formed with the spindle B. This spindle has a collar, C, formed at its inner end, and in this collar is a circumferential half-round groove, $a$. The outer end of the spindle B is reduced in circumference, and a collar, D, is placed thereon and fastened by a screw, $b$, said collar D being also provided with a circumferential half-round groove, $d$, as shown.

G represents the main hub, fitting between the collars C D, and its ends projecting over said collars. At each end of the hub is placed an annular plate, H, provided on its inner side with a flange, $h$, which extends between the collar and the end of the hub. In each collar is placed a series of anti-friction balls, $i\ i$, which are of such diameter as to be one half within the circumferential groove in the collar. The other half of the ball is within a groove formed one half in the hub and the other half in the flange $h$ on the annular plate H.

The plates H H are fastened to the hub G by means of bolts $u$, substantially as shown, or in any other suitable manner.

It will be seen that this hub and axle, as thus constructed, will be purely anti-friction without the use of grease or oil, and it cannot be stuck by getting dry or heating, and it obviates the filthy work of oiling.

What I claim as new, and desire to secure by Letters Patent, is—

The combination of the spindle B, with stationary grooved collar C and detachable grooved collar D, the hub G, the annular plates H H, with circular flanges $h\ h$, and the bolts $i$, all constructed substantially as and for the purposes set forth.

In testimony that I claim the above I have hereunto subscribed my name in the presence of two witnesses.

JOHN SMITH.

Witnesses:
 OTTO DUBOIS,
 WILLIAM HORROCKS.